United States Patent [19]

Ramsdale et al.

[11] Patent Number: 5,278,991
[45] Date of Patent: Jan. 11, 1994

[54] HANDOVER TECHNIQUES

[75] Inventors: Peter A. Ramsdale, Walden; Philip S. Gaskell, Shelford, both of United Kingdom

[73] Assignee: STC PLC, United Kingdom

[21] Appl. No.: 655,634

[22] Filed: Feb. 14, 1991

[30] Foreign Application Priority Data

Apr. 6, 1990 [GB] United Kingdom ............... 9007809

[51] Int. Cl.$^5$ .................... H04Q 7/02; H04Q 9/02
[52] U.S. Cl. .................... 455/33.2; 455/54.1; 455/56.1; 379/60
[58] Field of Search ........... 455/33.1, 33.2, 33.4, 455/34.1, 34.2, 54.1, 54.2, 56.1; 379/59, 60, 63

[56] References Cited

U.S. PATENT DOCUMENTS

| 4,144,411 | 3/1979 | Frenkiel | 379/60 |
| 4,398,063 | 8/1983 | Hass et al. | |
| 4,718,081 | 1/1988 | Brenig | 379/60 |
| 4,723,266 | 2/1988 | Perry | |

FOREIGN PATENT DOCUMENTS

| 3539698 | 5/1987 | Fed. Rep. of Germany . |
| 1564053 | 2/1980 | United Kingdom . |

OTHER PUBLICATIONS

Ballard, M.; Issenmann, E., "Digital Cellular Mobile-Radio System ECR900", in European Transactions on Telecommunications and Related Techn., vol. 1, No. 1, Jan.-Feb. 1990, pp. 17-30.
Patent Abstracts of Japan, vol. 13, No. 541, (E-854), Dec. 5, 1989, (relates to JP A 12 23 834 (NEC)).
IEEE Communications Magazine, vol. 27, No. 7, Jul. 1989, New York, (U.S.), pp. 20-29, R. Steele, "The Cellular Environment of Lightweight Handheld Portables".

*Primary Examiner*—Reinhard J. Eisenzopf
*Assistant Examiner*—Lisa Charouel
*Attorney, Agent, or Firm*—Lee, Mann, Smith, McWilliams, Sweeney & Ohlson

[57] ABSTRACT

In a cellular radio system having a two layer cell structure comprised by macrocells (1) overlaying microcells (2), handover occurs only via the macrocell layer. Thus when the quality of a call handled by a microcell (2) deteriorates below predetermined criteria the call is handed up rapidly to the umbrella macrocell and is only handed back down to a microcell when the handset has been in that microcell for a predetermined time and the quality of the link thereto exceeds predefined criteria.

7 Claims, 3 Drawing Sheets

5,278,991

HANDOVER TECHNIQUES

BACKGROUND OF THE INVENTION

This invention relates to cellular radio systems and in particular to handover techniques for use with communication networks involving radio cells.

Handover is a technique that allows calls in a personal or mobile communication network to be maintained as a handset or mobile station moves between radio cells. After a call is set up, the quality of the radio link is monitored by the handset and by the associated cell base station. In addition, other channels from the same and adjacent cells are also monitored as potential links to handover to. According to pre-defined criteria the call is switched to another base-station as the mobile/handset moves, or the propagation conditions change, in order to maintain a good quality link. If this is not done, then the call quality may deteriorate seriously or the call may be "dropped" altogether. Either the network of the handset/mobile may incorporate the intelligence to enable the decisions to be made on when, whether and to which cell the radio link should be switched.

This type of handover is well known and widely adopted in conventional cellular systems. However, it gives rise to problems in mobile or personal communication networks where handsets or mobiles are moving at speed through areas covered by small cells such as sectored or microcells. Since the cells are small, the time spent in a cell is short and the time taken to initiate and perform handover may be too long. This leads to poor call quality and dropped calls.

SUMMARY OF THE INVENTION

According to one aspect of the present invention there is provided a cellular radio system having a two layer cell structure comprised by macrocells overlaying microcells and wherein handover between cells only occurs via the macrocell layer.

According to another aspect of the present invention there is provided a handover technique for use with cellular radio systems having two layer cell structure comprised by macrocells overlaying microcells and such that handover between cells only occurs via the macrocell layer.

BRIEF DESCRIPTION OF THE DRAWING

Embodiments of the invention will now be described with reference to the accompanying drawings, in which.

DESCRIPTION OF THE PREFERRED EMBODIMENTS

Figure 1:
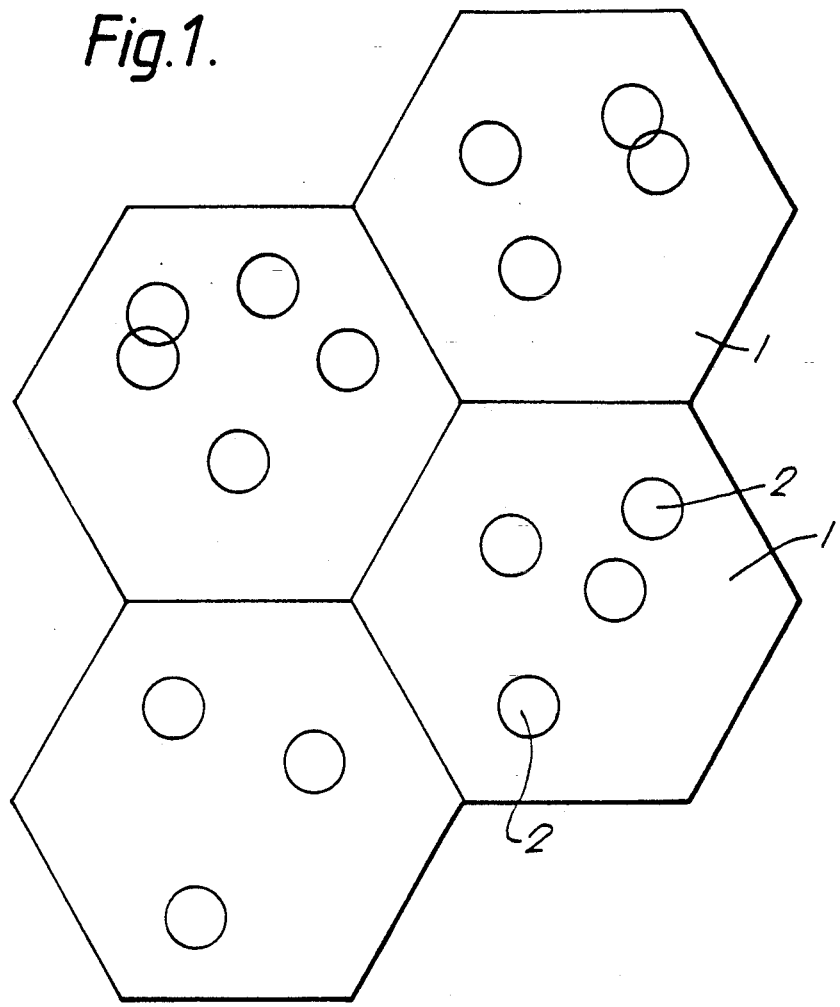
FIG. 1 illustrates a cell structure consisting of macrocells and microcells.

One cell structure suitable for high traffic personal communication networks (PCN) consists of a continuous layer of macrocells 1 (FIG. 1), which may be of 1 km or more radius and an underlay of microcells 2, for example 200 m radius, which are selectively deployed in areas of very high traffic densities. The microcells themselves do not necessarily touch to give continuous coverage but they lie within the umbrella coverage of the macrocells. Since microcells generally operate at low power levels, channel frequencies can be re-used at short spatial intervals, giving excellent spectral efficiency.

Handover between microcells 2 and macrocells 1 for slow speed (for example, walking) users can be accomplished using relatively conventional handover methods. However, if calls from high speed mobiles are handled by microcells, the time spent in each microcell is so short that the system cannot perform the necessary handover processes rapidly enough and the cell may be dropped. To avoid this, fast moving handsets should be handled by the macrocells and slow moving handsets should be handled by the microcells, when the handsets are in the microcell coverage areas, this is. However, this requires some means of detecting the speed of the handset. This can be done indirectly by a novel handover technique whose two basic aims are to maintain a call as the handset or mobile passes through macrocells and microcells even at high speed and to maintain high traffic levels in microcells for spectrum efficiency.

Figure 2:
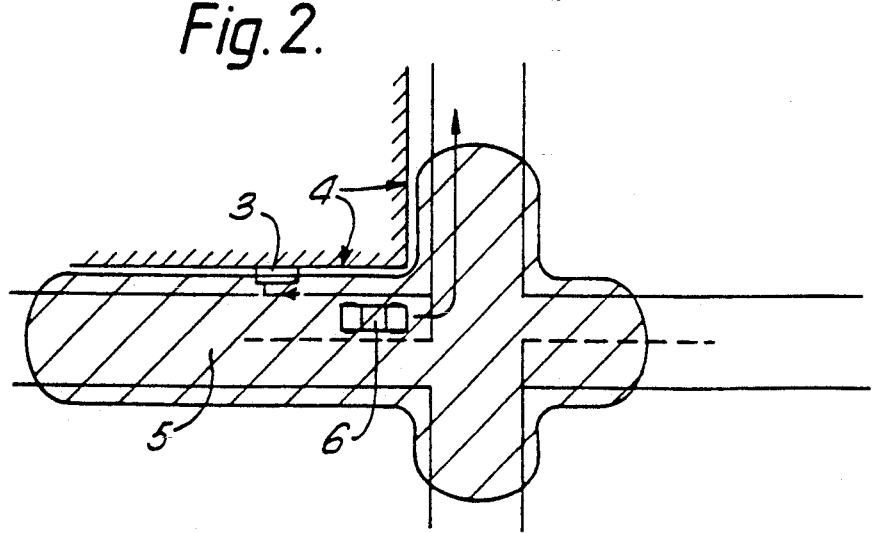
FIG. 2 illustrates a "rapid loss of signal" scenario.

Advantage is taken of the fact that microcells lie within the umbrella coverage of a macrocell. The handover technique is as follows. For a handset making a call via a microcell base-station and with the handset moving towards the microcell boundary, handover is performed rapidly to the macrocell. This is necessary because coverage from the microcell can be lost very quickly, for example when turning a corner into the shadow of a building. This is illustrated in FIG. 2. A microcell base-station 3 on the wall of a building 4 at a cross-roads produces a microcell 5. A car 6 carrying the handset and turning left at the cross-roads may quickly exit the microcell and result in the call being dropped unless handover to the umbrella macrocell is performed rapidly. Having handed the call up to the macrocell, one option that would support handset or mobiles moving at high speed would be for the call to continue to be handled by the macrocell base-station. However, if handover only occurred upwards from the microcell to the macrocell, then the traffic in the microcells would be reduced and this would defeat the purpose of using microcells in areas of high traffic. To remedy this, handover is performed downwards from the macrocell to the microcell when the handset has spent a sufficiently long period, for example several seconds, in a given microcell, that is with a slow time constant.

Figure 3:
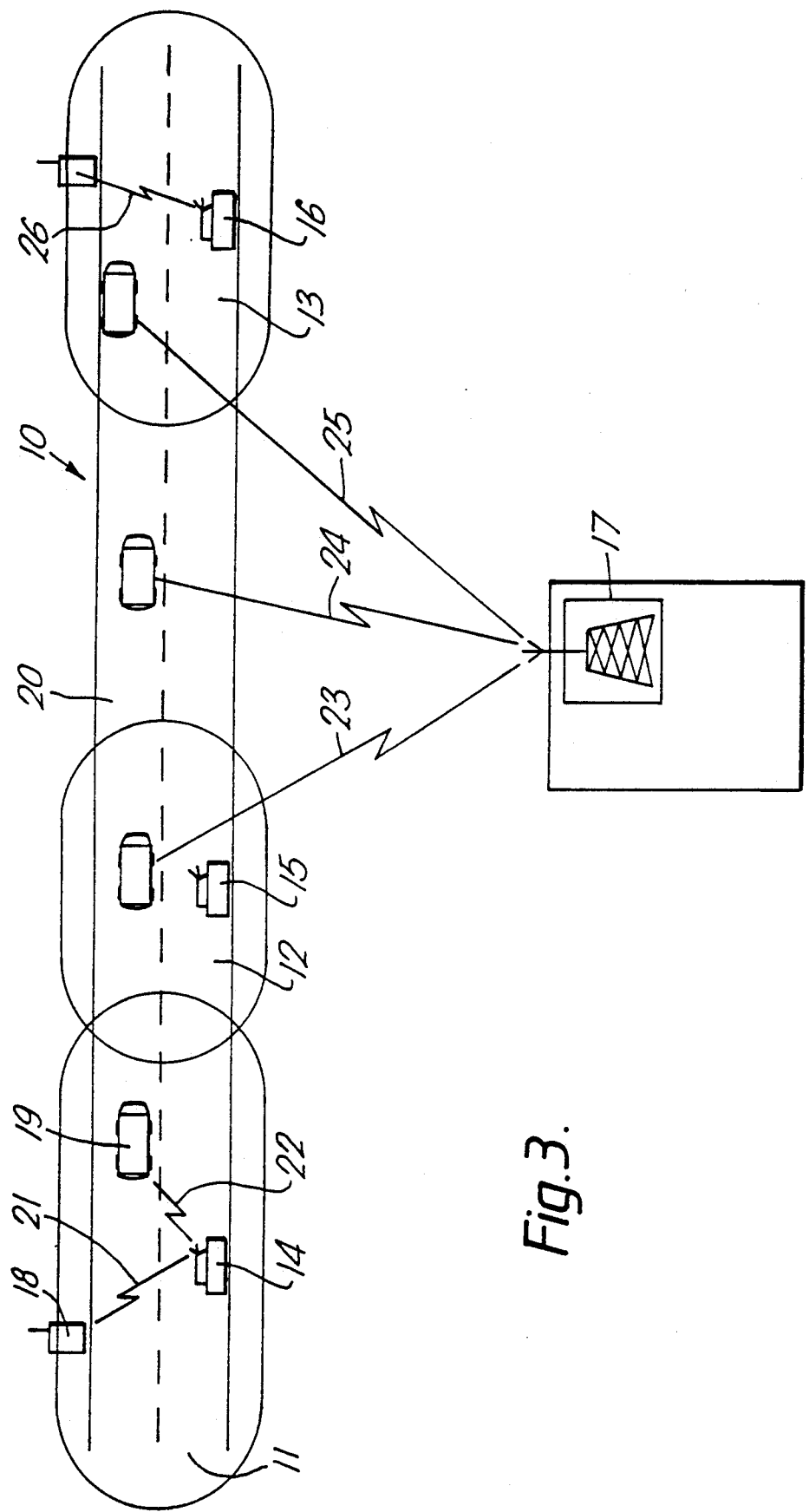
FIG. 3 illustrates an example sequence of handovers for a particular call and according to the present invention and, FIG. 4 illustrates a flow chart for the handover technique of the present invention.

The technique proposed will now be described further with reference to FIG. 3 which shows a sequence of handovers for the duration of a particular call. FIG. 3 shows a busy street 10, partially covered by microcells 11, 12 and 13 associated with microcell base-stations 14, 15 and 16, respectively and completely covered by a macrocell associated with macrocell base-station 17. A person with a handset 18 and located in microcell 11 places a cell which is set up via link 21 to the base-station 14 which is nearest. The person then enters a taxi 19 and the call continues to be handled by base-station 14 (link 22). As the taxi approaches the boundary of microcell 11, the call is handed up rapidly to the umbrella macrocell (link 23) to avoid degrading the call quality. It is not handed over to the next microcell 12 because the handset spends insufficient time there. As the taxi moves through other microcells 12 and 13 and area 20 covered only by the macrocell, the call continues to be handled by the macrocell base-station 17 (links 23, 24, 25). This occurs because the handset 18 does not remain long enough in a particular microcell for the call to be handed down to the microcell. Finally the taxi stops in microcell 13 and the person gets out. When the system has detected that the handset 18 has remained in microcell 13 for a predefined period, for example several seconds, the call is handed down to the microcell 13 (link 26). Assuming the person remains in microcell 13 link 26 is maintained until the call is terminated.

The need for handover can be determined by monitoring several different parameters, as in the case for conventional cellular radio handover. The simplest are the absolute field strength, relative field strength and bit error rate BER (for digital systems). Digital systems also enable delay or distance from the base-station to be used as indicators for handover. Further factors can be considered. For example, rate of change of distance from the base-station would show whether a mobile was moving rapidly or not. Such a measure could give an early indication of the need to hand up from a microcell. As is conventional the actual changeover decision can be taken by either the handset or the network.

In summary, a handover technique is proposed for a mobile PCN system in which there is a two layer cell structure consisting of contiguous, overlapping macrocells overlaying microcells. Handover only occurs via the macrocell, that is microcell to macrocell, macrocell to macrocell, or macrocell to microcell. Microcell to microcell handover does not occur. If the quality of a call being handled by a microcell deteriorates below pre-determined criteria, for example based on BER, field strength and/or distance measurement, the call is handed up rapidly to the macrocell (time-constant of a second or less). A call is only handed down from the macrocell to a microcell when the link from the handset to the particular microcell base-station is of adequate quality for more than a given duration (several seconds or more), that is when the handset has remained in the microcell for a substantial period.

Figure 4:
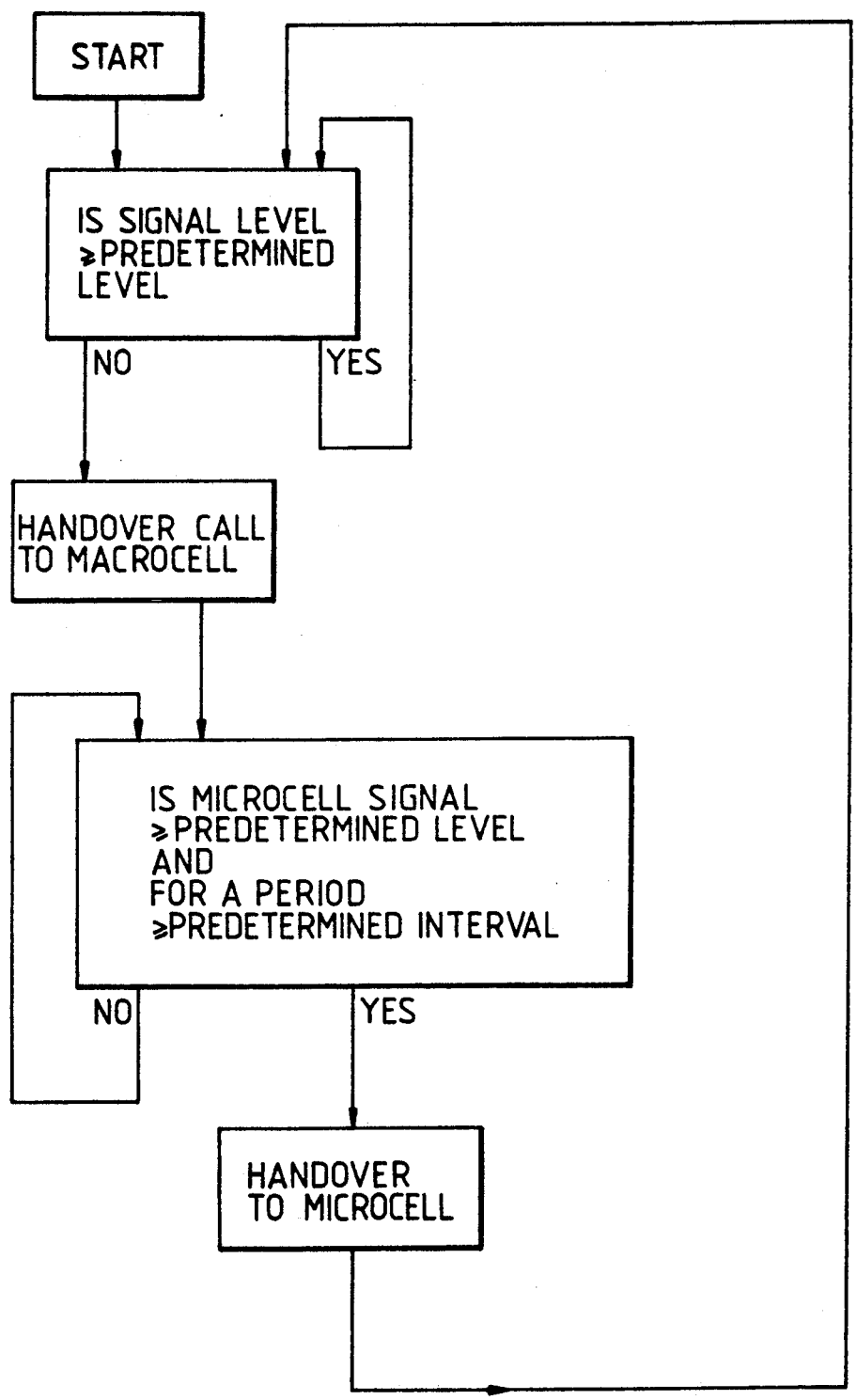

FIG. 4 is a flow chart of the two layer (macrocells and microcells) handover algorithm. It shows handover from microcell to macrocell and also from macrocell to microcell and is self-explanatory.

Attention is directed to our co-pending GB Application No 9007808 (Serial No 2242805A) (P A Ramsdale - P S Gaskell 6-5) corresponding to U.S. patent application Ser. No. 07/655635 filed Feb. 14, 1991, which relates to other handover techniques.

We claim:

1. A cellular radio system having a two layer cell structure comprised by a layer of macrocells overlying a layer of microcells and including means for determining when handover between cells of the two layer cell structure is required and means for performing said handover such that it only occurs via the layer of macrocells, and wherein when the quality of a call handled by one of said microcells deteriorates below predetermined criteria the call is handed up to the overlying macrocell rapidly.

2. A cellular radio system as claimed in claim 1 wherein the call associated with a mobile equipment is only handed down from one macrocell to one underlying microcell when a link from the equipment to a base-station associated with said underlying microcell when the quality exceeds predefined criteria for greater than a predetermined time.

3. A cellular radio system as claimed in claim 2 wherein the equipment is a handset.

4. A cellular radio system as claimed in claim 1 wherein the criteria for the quality of the call include one or more of bit error rate, field strength, distance measurement, rate of change of distance.

5. A handover technique for use with cellular radio systems having a two layer cell structure comprised by a layer of macrocells overlying a layer of microcells and including the steps of determining when handover between cells of the two layer cell structure is required and performing said handover such that it only occurs via the layer of macrocells, and wherein the determining step comprises monitoring the quality of a call handled by one of said microcells and when the quality of the call deteriorates between predetermined criteria performing said handover such that the call is handed up to the overlying macrocell rapidly.

6. A handover technique as claimed in claim 5 and further including the step of handing down the call associated with a mobile equipment from one macrocell to one underlying microcell only when a link from the equipment to a base station associated with said underlying microcell has been determined the quality exceeds predefined criteria for greater than a predetermined time.

7. A handover technique as claimed in claim 5 wherein the criteria for the quality of the call include one or more of bit error rate, field strength, distance measurement, rate of change of distance.

* * * * *